June 23, 1942.  C. C. CLYMER  2,287,603

FREQUENCY CHANGER SET

Filed April 1, 1942

Inventor:
Charles C. Clymer,
by Harry E. Dunham
His Attorney.

Patented June 23, 1942

2,287,603

UNITED STATES PATENT OFFICE 2,287,603

FREQUENCY CHANGER SET

Charles C. Clymer, Altamont, N. Y., assignor to General Electric Company, a corporation of New York Application April 1, 1942, Serial No. 437,107

3 Claims. (Cl. 171—123)

My invention relates to frequency changer sets such as those employed to connect two power systems of different fixed frequencies or to supply power from a power system of fixed frequency to a system at a different frequency. My invention has for its purpose an economical use of the machines of the set and good power factor control while allowing flexibility as to the direction and extent of power flow through the set and to allow for slight variations in the frequency relation of the two interconnected power systems.

The features of my invention which are believed to be novel and patentable will be pointed out in the claims appended hereto. For a better understanding of my invention reference is made in the following description to the accompanying drawing illustrating in Fig. 1 my frequency changer set as connected between two power systems of different frequency and Fig. 2 represents an automatic control feature that may be used.

Figure 1:
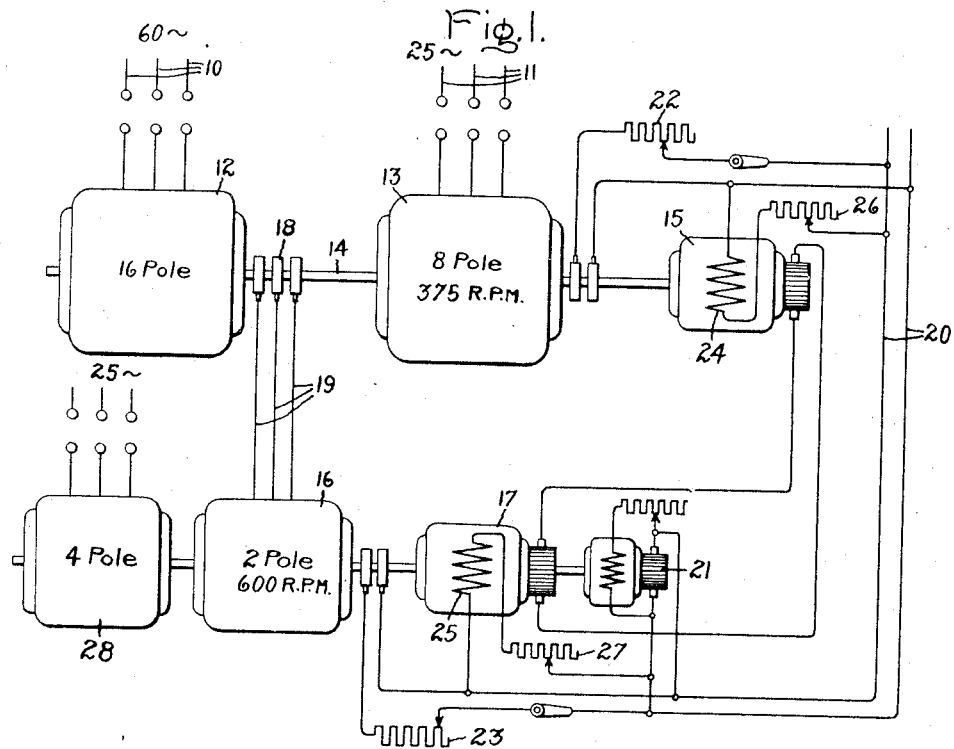
Figure 2:
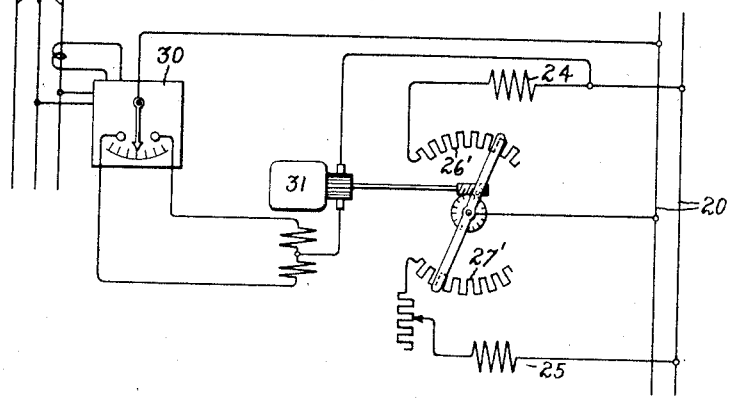

For the purpose of illustration in Fig. 1, I have represented my frequency changer set as connected between a 60 cycle power system 10 and a 25 cycle power system 11. The main machines of the set comprise a wound secondary induction machine 12 and a synchronous machine 13 directly connected together by shaft 14. The auxiliary or control apparatus comprises a direct current machine 15 connected to shaft 14 and driven with the main set and an auxiliary set consisting of a synchronous machine 16 directly connected to a direct current dynamo electric machine 17.

When in operation as a frequency changer set the secondary winding of machine 12 is connected to the primary winding of synchronous machine through slip rings 18 and connections 19 and the armature windings of the direct current machines 15 and 17 are connected in series. The direct current field windings of the synchronous machines 13 and 16 and of the direct current machines 15 and 17 are supplied from a direct current bus 20 the voltage of which is independent of the armature voltage of the direct current machines. The bus 20 may be supplied by a direct current exciter 21 directly connected with and driven by the auxiliary set as shown. The direct current field windings of the synchronous machines 13 and 16 have rheostats 22 and 23 in their energizing circuits for power factor control purposes. The field windings 24 and 25 of the direct current machines have rheostats 26 and 27 in their energizing circuits to control the direction and magnitude of the flow of power through the main frequency changer set.

The apparatus may be started in different ways. For example, for relatively small capacity sets, the primary of machine 12 may be connected to power system 10 and its secondary connected to a variable resistance, and the resistance reduced until the main set is operating at such speed as will permit synchronizing of machine 13 with its power system 11. For large capacity sets it will be preferable to provide an induction starting motor 28 for the auxiliary set, then start the larger set using machine 15 as a motor supplied from machine 17 as a generator. This will avoid the expense of any switch between machines 16 and 12. I may thus use a permanent connection 19 between such machines and also permanent connections for the direct current machines.

In order to give a practicable example, let it be assumed that machine 12 is a 16 pole machine and synchronous machine 13 an 8 pole machine. The synchronous speed of an 8 pole 25 cycle synchronous machine is 375 R. P. M. Hence the large set will be brought up to 375 R. P. M. and machine 13 synchronized and connected with the 25 cycle system 11 with its field winding energized through rheostat 22 from bus 20. The speed of the main set will thereafter be determined by the frequency of the 25 cycle system at 375 R. P. M. with such minor variations from such speed as may occur by slight variations in frequency of the 25 cycle system. The starting motor 28 may now be disconnected. This motor may be a four pole 25 cycle motor and be started from the 25 cycle system. Also I may provide motor 16 with an induction starting winding and a pole changing stator winding and use it for starting purposes. The secondary frequency of the 60 cycle 16 pole machine 12 operating at 375 R. P. M. is 10 cycles. If we make synchronous machine 16 a 2 pole machine, it will need to be brought to 600 R. P. M. to generate 10 cycles. Hence the auxiliary set is brought to 600 R. P. M. and the field winding of synchronous machine 16 energized and its A. C. voltage adjusted so that machine 12 may be synchronized without shock by closing of the line switch between the 60 cycle system and machine 12.

The apparatus is now ready for use as a frequency changer tie. In such operation machine 12, although in the form of an induction machine, operates as a double fed synchronous machine with alternating current excitation supplied to its secondary by synchronous machine 16. Hence its power factor may be adjusted to a high or even leading value by adjusting the direct current field winding of synchronous machine 16. Likewise the power factor of synchronous machines 13 and 16 may be controlled by adjustment of their direct current exciting windings. Thus good power factor of all alternating current machines is provided for.

While both machines 12 and 13 operate as synchronous machines, the tie between the two systems 10 and 11 is not rigid and minor variations in frequency of one system with respect to the other cause no difficulty. The bulk of the power transferred from one system to the other is conveyed mechanically through shaft 14 from one main machine to the other. Such transfer may occur in either direction and its direction and magnitude is controllable by relative adjustment of the field windings of the direct current machines.

If we wish to transmit power from system 10 to 11, machine 12 must operate as a motor and machine 13 as a generator. In addition to the power transferred mechanically through shaft 14, electrical power is given out from the secondary of machine 12 to drive auxiliary machine 16 as a motor. Machine 17 is driven as a generator and supplies machine 15 which acts as a motor and assists machine 12 to drive the generator 13. All of the power fed into machine 12 from line 10 less the losses in the machines is fed to line 11. To effect such operation all that is necessary is to adjust one or both of the field windings 24 and 25 of the direct current machines so that machine 17 operates as a generator and machine 15 as a motor. To increase the load transfer the current of field winding 25 of machine 17 should be increased or that of field winding 24 of machine 15 decreased or both. To decrease the load transfer the direct current field windings are regulated in the reverse sense and if this is continued far enough, the transfer of power in all machines will reverse so as to transfer power from system 11 to system 10. When power is being transferred from system 11 to system 10 machines 13 and 17 act as motors and machines 15, 16 and 12 as generators.

If desired, automatic control of the power transfer in either direction may be had by apparatus such as is shown in Fig. 2. In Fig. 2, 30 represents a contact making wattmeter connected in the leads from machine 13 to power line 11 and which is connected to measure the power flow from or to such line. It controls a reversible pilot motor 31 arranged to operate the rheostats 26' and 27' of the field windings 24 and 25. By suitably connecting the wattmeter and adjusting its contacts the power flow in either direction can be automatically controlled within desired limits. It will be noted that when rheostat 26' is cut in, rheostat 27' is cut out and vice versa. Similarly, contact making power factor meters may be connected in the outgoing leads of machines 12 and 13 to automatically control field rheostats 23 and 22 to automatically maintain desired power factors.

In designing such a frequency changer set to obtain best economy and operation consideration should be given to the relative pole number of machines 12, 13 and 16 and the frequencies involved. The relative capacity of the different machines for good economy depends upon the relative amount of mechanical and electrical power given out by machine 12 when acting as a motor or the relative amount of mechanical and electrical power put into this machine when acting as a generator. When operating as a motor at full load the electrical power output from the secondary of machine 12 is proportional to the rating of the machine times the ratio of secondary to primary frequency. Thus, if motor 12 be rated at 20,000 kw. and otherwise rated as hereinbefore proposed, its full load secondary electrical output will be $^{10}/_{60} \times 20,000$ or 3300 kw. Hence in the example given machines 16, 17 and 15 should have a rating of 3300 kw. Machine 13 should have the same rating as machine 12 if power is to be transferred in both directions.

It will also be generally desirable to select a low secondary frequency for machine 12 in order to keep the size of the auxiliary machines as low as possible, but if we go much below 5 cycles the operation of synchronous machine 16 is likely to be unstable.

In order to obtain a good running speed and correspondingly small size of the machines 16 and 17, it is desirable to make the pole number of machine 16 low, as for example, 2 pole. It is also desirable to connect the wound secondary induction machine such as 12 to the higher frequency power system in order to best satisfy the economy conditions explained above.

It is, of course, possible to operate the induction machine above its synchronous speed to obtain a secondary frequency suiable for stable operation of synchronous machine 16. If, for instance, in the example already given, I change machine 13 from an 8 pole to a 6 pole machine, the speed of the main set will be 500 instead of 375 R. P. M. The 16 pole machine 12 will then have to operate above its synchronous speed of 450 R. P. M. and will have a secondary frequency of $6\frac{2}{3}$ cycles. The 2 pole machine 16 will have to operate at the corresponding slower speed of 400 R. P. M. and when machine 12 is acting as a motor machines 16 and 15 will act as generators because with machine 12 operating as a motor above synchronism, electrical power will have to be put into both its primary and secondary windings. Hence machine 12 will have to drive both machines 13 and 15 as generators. In general, this will not be as economical as the arrangement previously described where machine 12 operates below its synchronous speed because where machine 12 operates below synchronous speed the transfer of electrical and mechanical power through machine 12 to or from power line 10 is in the same direction, whereas when machine 12 operates above synchronous speed the reverse is true.

It will be evident that the apparatus described may be used to supply a system 10 with a regulatable voltage alternating current at a frequency proportional to the frequency of system 11 where system 10 has no other power supply. The apparatus may be used to supply adjustable frequency power from machine 13 taking power from power system 10 if machine 12 be operated above its synchronous speed where its operation will be stable and controllable under this condition where machine 13 does not fix the speed of the main set.

What I claim as new and desire to secure by Letters Patent of the United States is:

1. A frequency changer comprising a main set having a wound secondary induction machine and a synchronous machine with their rotary members mechanically connected together, auxiliary control apparatus therefor comprising a synchronous machine and a direct current machine having their rotary members mechanically connected together, the synchronous machine of said auxiliary apparatus being electrically connected to the secondary of said induction machine, a second direct current machine having its rotary member mechanically connected with the rotary members of the main set and being electrically connected in series with the first mentioned direct current machine, a direct current supply for the field windings of said synchronous and direct current machines and means for varying the current in such field windings.

2. A frequency changer comprising a main set having a wound secondary induction machine and a synchronous machine with their rotary members mechanically connected together, auxiliary control apparatus therefor comprising a synchronous machine and a direct current machine with their rotary members mechanically connected together, the synchronous machine of said auxiliary apparatus being permanently connected to the secondary of said induction machine, and a second direct current machine having its rotary member mechanically connected with the rotary members of the main set and its armature permanently connected in series with the armature of the first mentioned direct current machine, a separate source of direct current supply for the field windings of said synchronous and direct current machines, and means for individually varying the currents in said field windings.

3. A frequency changer tie for use between power systems of different frequencies comprising an induction machine for connection to the higher frequency system and a synchronous machine for connection to the lower frequency system, said machines having their rotary members on a common shaft and having a pole number relation such that when connected to their different frequency systems and operating at the speed determined by the synchronous machine the induction machine operates below its synchronous speed with a secondary frequency of between 5 and 12 cycles, and means for conveying an adjustable amount of power between the secondary of said induction machine to said shaft comprising an auxiliary synchronous machine electrically connected in series with the secondary of said induction machine, a direct current machine mechanically connected in driving relation with said auxiliary synchronous machine and a direct current machine mechanically connected to said shaft and electrically connected in series with the first mentioned direct current machine, a separate source of direct current excitation for the field windings of the direct current and synchronous machines and means for adjusting the relative value of the excitation supplied to the different field windings.

CHARLES C. CLYMER.